Oct. 24, 1939.  G. S. SCHAIRER  2,177,499
AIRCRAFT
Filed March 3, 1937  6 Sheets-Sheet 1

INVENTOR
GEO. S. SCHAIRER
BY
*B. E. Wilson*
ATTORNEY

Oct. 24, 1939.　　　G. S. SCHAIRER　　　2,177,499
AIRCRAFT
Filed March 3, 1937　　　6 Sheets-Sheet 2
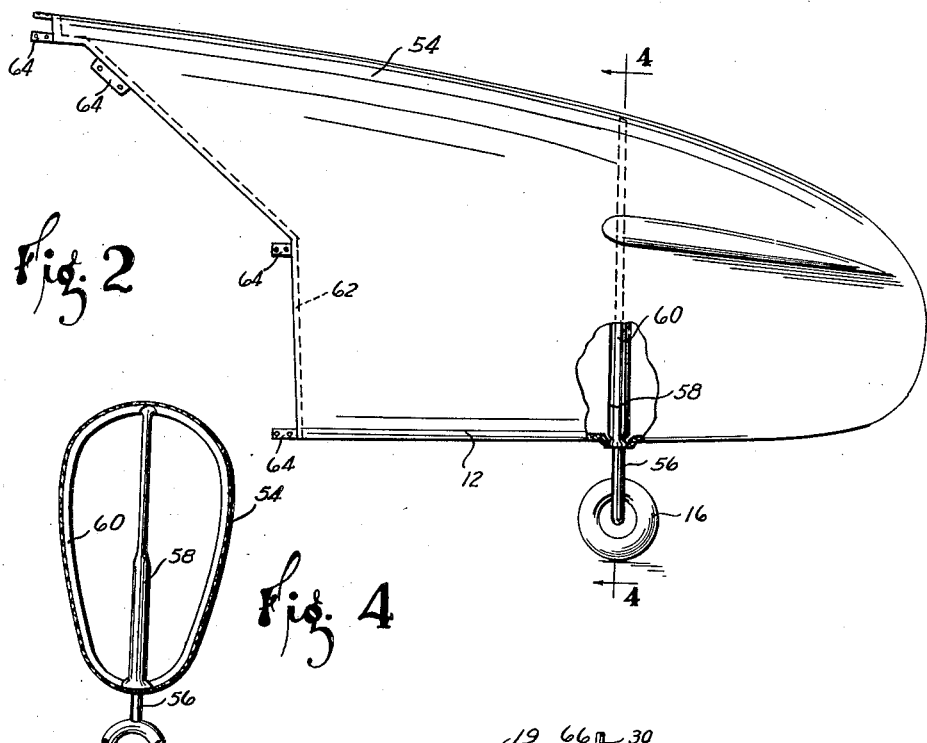
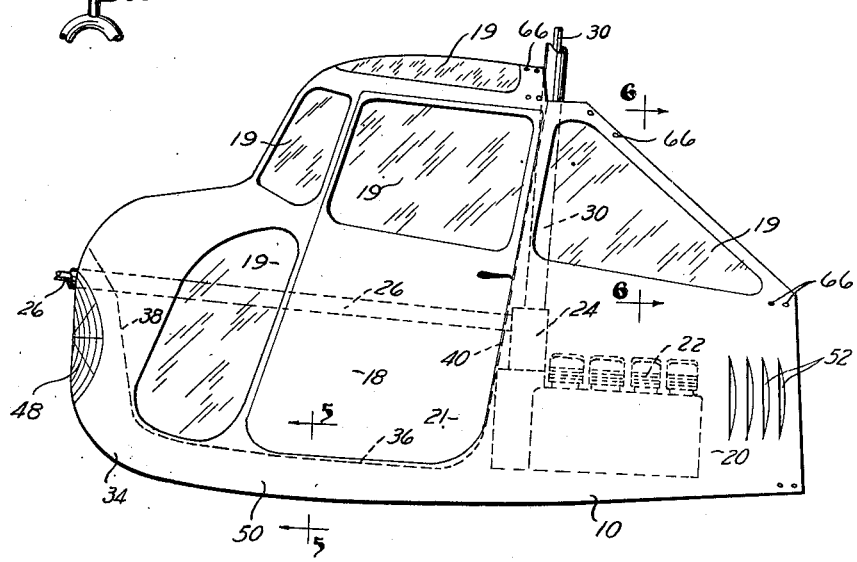
INVENTOR
GEO. S. SCHAIRER
BY
A. E. Wilson
ATTORNEY Oct. 24, 1939.                G. S. SCHAIRER                2,177,499
                                 AIRCRAFT
                            Filed March 3, 1937           6 Sheets-Sheet 3

INVENTOR
GEO. S. SCHAIRER
BY
A. E. Wilson.
ATTORNEY

Oct. 24, 1939.  G. S. SCHAIRER  2,177,499
AIRCRAFT
Filed March 3, 1937  6 Sheets-Sheet 4
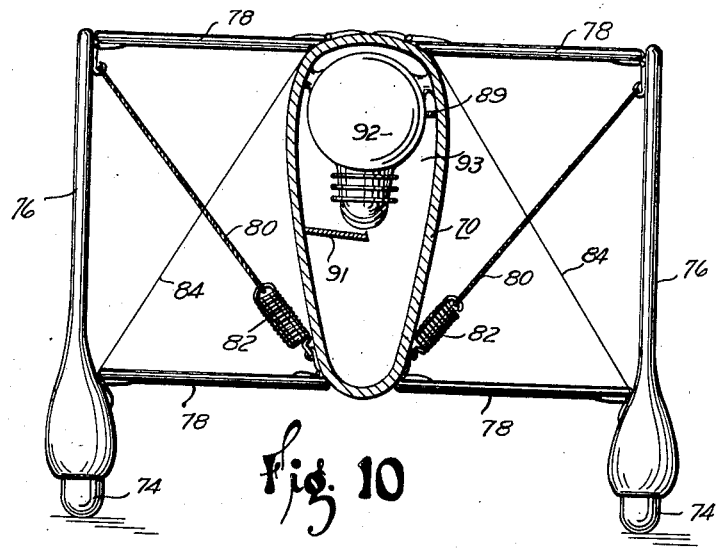
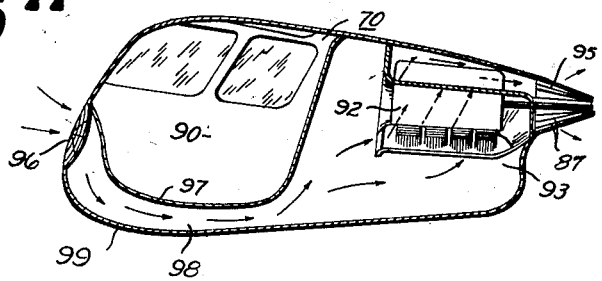
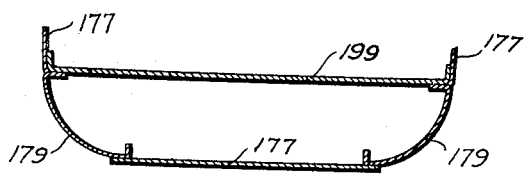
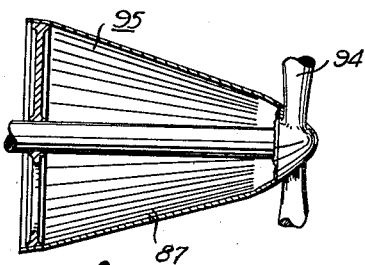
INVENTOR
GEO. S. SCHAIRER
BY
ATTORNEY Oct. 24, 1939.　　G. S. SCHAIRER　　2,177,499
AIRCRAFT
Filed March 3, 1937　　6 Sheets-Sheet 5

INVENTOR
Geo. S. Schairer
BY
A. E. Wilson
ATTORNEY

Oct. 24, 1939.  G. S. SCHAIRER  2,177,499
AIRCRAFT
Filed March 3, 1937    6 Sheets-Sheet 6
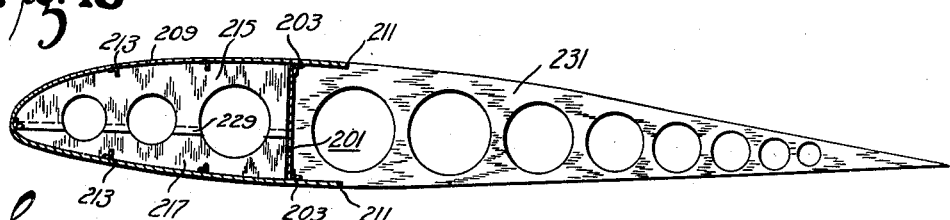
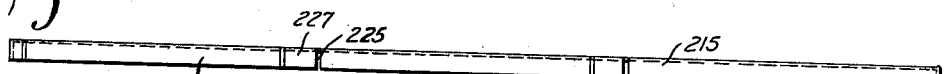
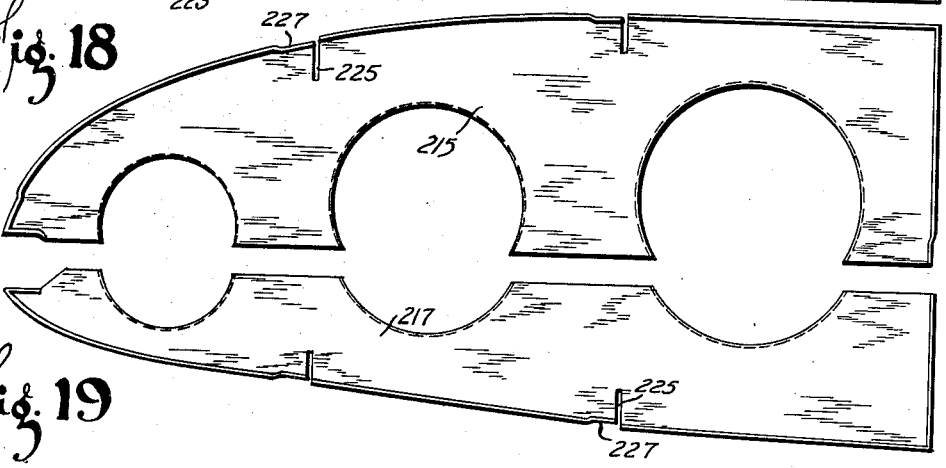
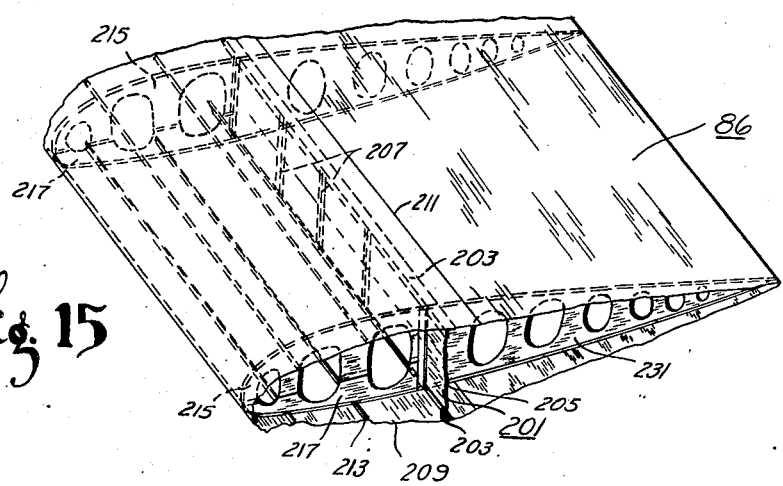
INVENTOR
GEO. S. SCHAIRER
BY
A. E. Wilson
ATTORNEY Patented Oct. 24, 1939

2,177,499

UNITED STATES PATENT OFFICE 2,177,499

AIRCRAFT

George S. Schairer, South Bend, Ind., assignor to Bendix Products Corporation, South Bend, Ind., a corporation of Indiana Application March 3, 1937, Serial No. 128,722

3 Claims. (Cl. 244—117)

This invention relates to aircraft, and more particularly to means for fabricating aircraft economically.

Aircraft as constructed in the past have been subject to certain objectionable characteristics, particularly in that they have not been designed in such a manner that they could be fabricated economically from materials designed to provide adequate strength to protect the pilot and passengers without increasing the weight of the aircraft structure more than was desirable in that type of craft.

An object of this invention is to provide an aircraft, incorporating certain novel constructional details, which may be manufactured economically.

Another object of the invention is to provide an aircraft fuselage having a metallic section forming passenger and engine compartments, and a fabricated section including the control members operably connected to the metallic section.

A further object of the invention is to form a metal and plywood fuselage wherein the engine is positioned behind the passenger compartment.

A still further object of the invention is to provide an aircraft fuselage wherein an air-cooled engine is positioned behind the passenger compartment, and air for cooling purposes is admitted at the front of the fuselage and directed under the passenger compartment to the engine.

Yet a further object of the invention is to provide an airplane fuselage wherein the forward portion of the fuselage is formed of metal shaped to form a rigid box type structure, and wherein a unitary molded rear fuselage section is adapted to be attached to the metallic section to complete the fuselage.

Another object is to provide a streamlined metallic fuselage wherein a generally horizontally disposed plate is fixed in the fuselage to provide a floor in the passenger compartment and to strengthen the fuselage.

Yet a still further object of the invention is to provide a metallic fuselage structure wherein a single formed sheet metal frame may be employed to form the rounded corners of the fuselage, and substantially flat plates may be employed to complete the fuselage structure.

A further object is to provide a fuselage structure wherein a metallic box type forward section is provided to house passenger and engine compartments, and wherein the rear section of the fuselage is formed as a unitary molded structure which may be removed from the forward section to gain access to the engine positioned behind the passenger compartment.

Another object of the invention is to provide novel cooling means for an air-cooled aircraft engine which comprises admitting air to the fuselage at the forward end thereof and directing the air beneath the passenger compartment to cool the engine positioned behind the passenger compartment, and drawing the air out of the engine compartment by means of a sirocco blower driven by the drive shaft of the engine.

A still further object of the invention is to provide novel stabilizing and landing gear means wherein the wheels of the landing gear are streamlined with reference to generally vertically disposed members of the stabilizing means.

A further object of the invention is to provide novel means for supporting a stabilizing ring on a fuselage to increase the efficiency of the propeller and also act as stabilizing surfaces.

Yet a further object is to provide a novel wing structure wherein a metallic nose section formed of reinforced sheet metal fabricated in a novel manner, and a fabric covered rear section are employed.

Another object of the invention is to provide a streamlined rear fuselage section formed of molded material.

A further object is to form a fuselage section of plywood.

Yet a still further object of the invention is to provide novel reinforcing means for sheet metal segments used in aircraft construction.

Other objects and advantages of this invention will be apparent from the following detailed description of several illustrative embodiments, considered in connection with the accompanying drawings submitted for purposes of illustration only and not intended to define the scope of the invention, reference being had for that purpose to the subjoined claims.

In the drawings, wherein similar reference numerals have been applied to corresponding parts:

Figure 2 is an enlarged view, partly in section of a portion of Figure 1;

Figure 3 is also an enlarged view of another portion of Figure 1;

Figure 4 is a view taken on the line 4—4 of Figure 2;

Figure 10 is a view taken on the line 10—10 of Figure 8;

Figure 11 is a vertical section of the fuselage shown in Figures 8 and 9 showing the direction of flow of cooling air;

Figure 12 is a side elevation of the sirocco blower shown in Figure 11;

Figure 14 is a view taken on the line 14—14 of Figure 13;

Figure 15 is a perspective view of a novel wing embodied within the present invention;

Figure 16 is a side elevation of a rib shown in Figure 15;

Figure 17 is a plan view of the rib shown in Figure 16;

Figure 18 is an enlarged view of the upper nose structure shown in Figure 16; and Figure 19 is an enlarged view of the lower nose structure shown in Figure 16.

Figure 1:
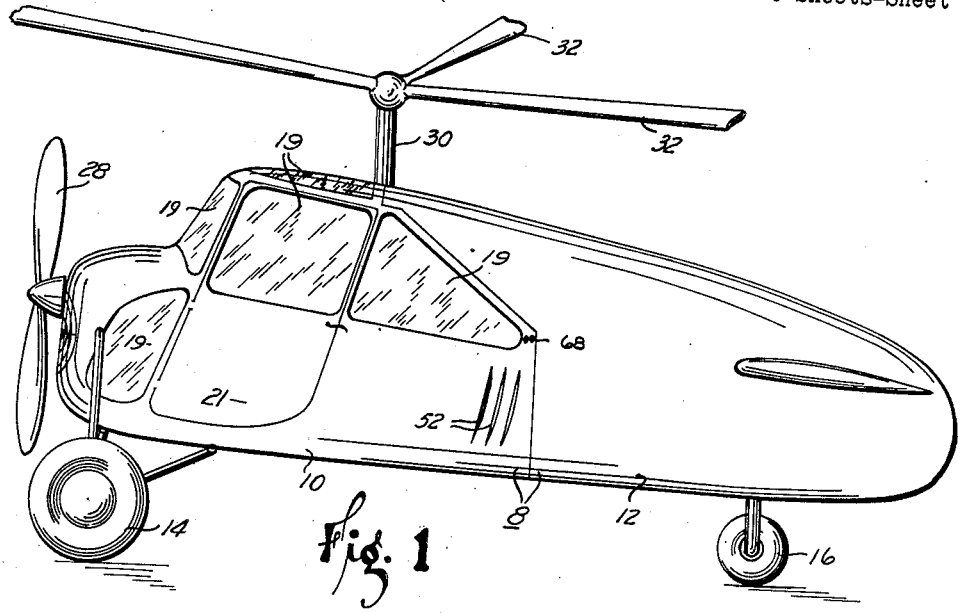
Figure 1 is a side elevation of an aircraft embodying the present invention.

The embodiment of the invention shown in Figures 1 to 7 has been illustrated as applied to an aircraft of the rotary wing type.

In this embodiment the aircraft fuselage 8 is formed in two sections, a forward section 10, preferably formed of metal, and a rear section 12, preferably formed of plywood or molded material.

The forward section 10 of the fuselage is provided with a pair of spaced landing wheels 14, and the rear section is provided with a single landing wheel 16.

As more clearly shown in Figure 3, the forward section 10 is proportioned to form a passenger compartment 18 having windows 19 and doors 21, and an engine compartment 20 adapted to receive an air-cooled engine 22. The engine 22 is operably connected, through a gear box 24 to drive a forwardly directed generally horizontally disposed shaft 26, having a generally vertically disposed propeller 28 fixed thereto. The gear box 24 is also designed to transmit power from the engine 22 to drive a generally vertically disposed shaft 30, having generally horizontally disposed rotatable wings 32 fixed thereto.

The forward fuselage section 10 is formed of metallic sheets 34, fixed together in any desired manner, as by welding. The metallic sheets 34 are curved to form a streamlined structure as more clearly shown in Figures 3 and 5.

Figure 5:
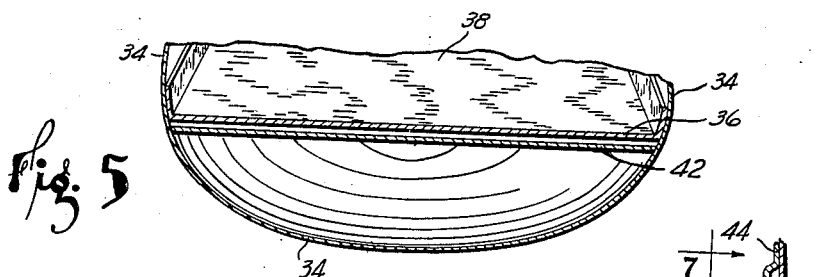
Figure 5 is a view taken on the line 5—5 of Figure 3.

Reinforcing means including a generally horizontally disposed sheet of metal 36 extends across the bottom of the fuselage and is fixed to the sheets 34 in any desired manner, such, for example, as by welding, as more clearly shown in Figure 5. The reinforcing sheet 36 forms the bottom of the passenger compartment 18. Extension of the floor board sheet 36 at its forward and rearward ends as at 38 and 40 form the toe-board and back of the passenger compartment respectively. It should be noted that the reinforcing sheet 36 and its extensions 38 and 40 cooperate with the outer shell sheets 34 forming an air passage in the fuselage section 10 and also provides a structure which is particularly strong torsionally. It may also be noted that the floor sheet is reinforced at desired intervals with reinforcing channels 42.

Figure 6:
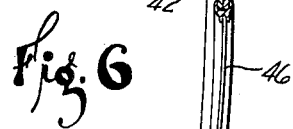
Figure 6 is a view taken on the line 6—6 of Figure 3.
Figure 7:
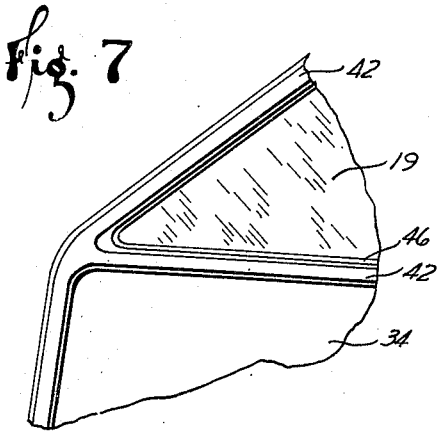
Figure 7 is a view taken on the line 7—7 of Figure 6.

The sheets 34 forming the outer shell of the fuselage may be reinforced by the novel reinforcing segments shown on Figures 6 and 7. It will be observed that channel shaped reinforcing segments 42 are provided with attaching segments 44, which may be fixed to the sheets 34 in any desired manner as by welding. A stiffening head 46 engaging the edge of the sheet 34 and the edge of the segments 44 reinforces the structure at the windows 19 of the fuselage.

Air for cooling the engine 22 may be admitted through an aperture 48 in the forward end of the fuselage section 10. The air is directed through a tunnel 50 under the passenger compartment 18 by the sheets 38 and 36 respectively to the engine compartment 20. The air flows over the engine to cool it and is discharged from the compartment 20 through louvres 52.

The rear section 12 of the fuselage may be formed as a unitary structure of plywood or molded material 54 adapted to be fastened to the front section 10 to form the complete fuselage.

It will be observed that the tail wheel 16 is carried by a forked spindle 56 adapted to slide into a tube 58 carried in the section 12. The spindle 56 and the tube 58 may be shaped to form a shock absorber, or any desired shock absorbing means may be employed therewith. Attention is directed to the fact that the tube 58 is supported in a metallic ring 60 formed integral with the plywood or molded material 54.

The front end of the rear section 12 is provided with a metallic head 62 having attaching lugs 64 fixed thereto embedded in the plywood or molded material 54. The lugs 64 cooperate with apertures 66 in the front section 10 to receive fastening means 68 to attach the front and rear sections 10 and 12 of the fuselage together.

It will be noted that a fuselage which is strong in the sections occupied by the pilot or passengers is provided, yet the over-all weight of the craft is low since the rear section is extremely light. The rear section, however, due to its shape, is adequately strong to withstand the loads to which it is subjected.

To gain access to the engine compartment 20 to service the engine 22, it is merely necessary to jack up the rear portion of the front section 10, remove the fastening means 68 and separate the sections 10 and 12, whereupon full access to the engine 22 is permitted.

The embodiment of the invention shown in Figures 8 to 12 has been illustrated as applied to an aircraft of the type wherein the supporting wing means is pivotally mounted with reference to the fuselage, and the craft is controlled both laterally and longitudinally by varying the angular relations of the supporting wing means with reference to the fuselage, as more clearly disclosed in my copending application, Serial Number 125,438, filed February 12, 1937.

This embodiment of the invention is illustrated as embodied in a fuselage 70 of the type wherein a single steerable forwardly disposed landing gear wheel 72 is employed, and a pair of spaced rearwardly disposed landing gear wheels 74 are employed. The wheels 74 are carried by and streamlined with reference to spaced generally vertically disposed stabilizing surfaces 76. The vertically disposed stabilizing surfaces 76 are interconnected by means of generally horizontally disposed stabilizing surfaces 78. The stabilizing surfaces 76 and 78 cooperate to provide a directionally stable fuselage.

The upper ends of the vertically disposed stabilizing surfaces 76 are provided with angularly disposed guide wires or struts 80, operably connected through yielding means 82 to the lower portion of the fuselage 70, to permit vertical movement of the wheels 74 to act as shock absorbing means between the fuselage 70 and the ground. Guide wires 84, connected to the lower portion of the vertically disposed stabilizing surfaces 76, and to the upper portion of the fuselage 70 prevent the wheels 74 from dropping below the desired operating position, wherein the stabilizing surfaces 78 are positioned in a generally horizontally disposed position, while the craft is in flight.

The fuselage 70 is operably connected to supporting wing means 86 by means of a pylon 88. The wing 86 may be oscillated vertically with reference to the fuselage 70 to control the craft longitudinally by means of a manually operable control member 88, and may be oscillated about the top of the pylon 85 to control the craft laterally.

The fuselage 70 is of the type wherein a passenger compartment 90 is positioned at the forward end. An engine 92, preferably of the inverted air-cooled type, is positioned in an engine compartment 93, at the rear end of the fuselage and drives a propeller 94 of the pusher type.

Air for cooling the engine 92 is admitted through an aperture 96 in the forward end of the fuselage 70 and is directed through a tunnel 98 formed between an outer shell 99 of the fuselage, and a fuselage stiffening plate 97, welded or otherwise fixed to opposite sides of the outer shell 99, to the engine compartment 93. A blower 95, preferably of the sirocco type, having air moving vanes 87 driven by the engine 92, is positioned between the propeller 94 and the engine 92. The air is directed by baffles 91 and 89 to flow between the cylinders and around the engine 92 to effect adequate cooling.

Figure 13:
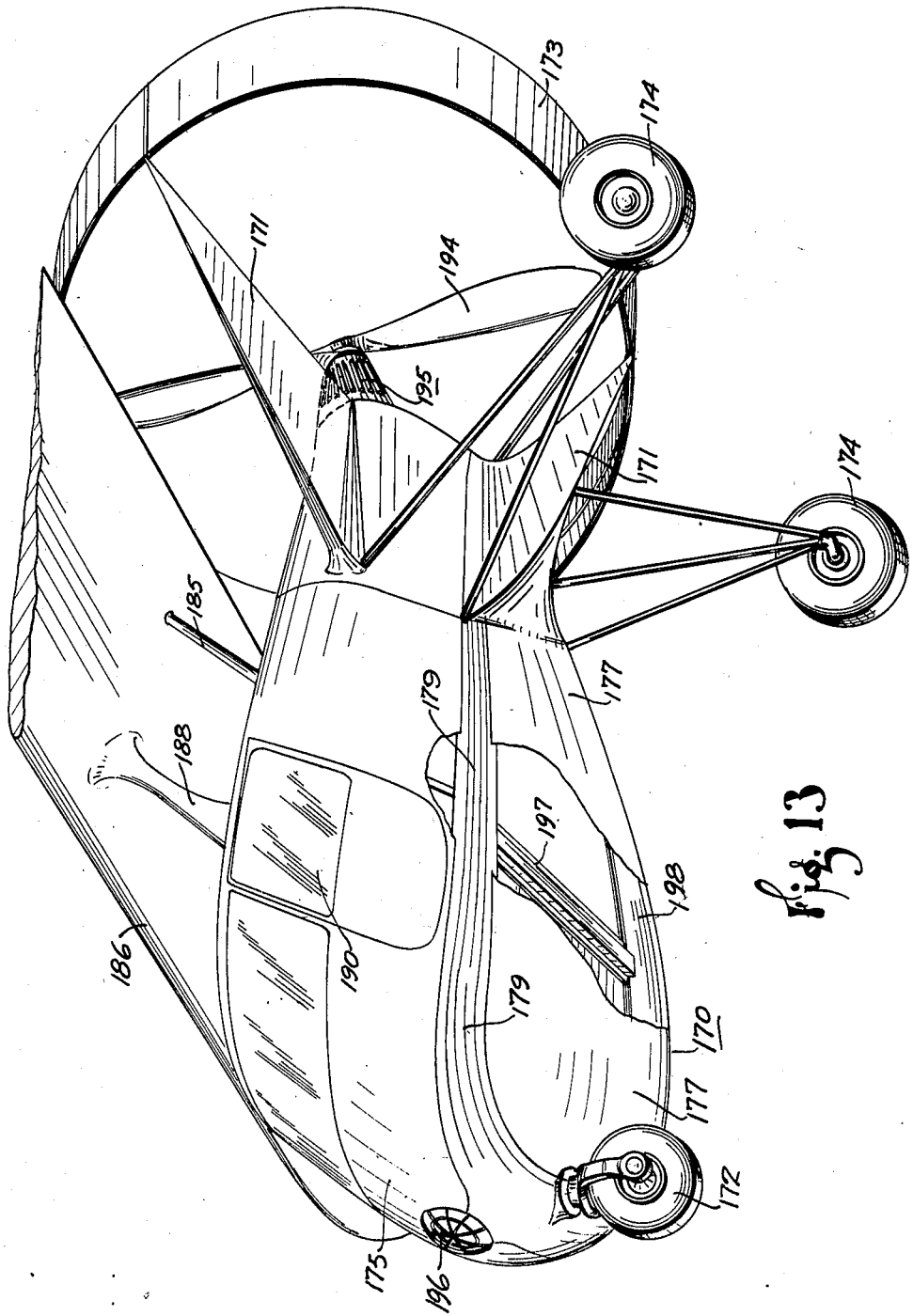
Figure 13 is a perspective view, partly in section of a further modified form of the invention.

The embodiment of the invention illustrated in Figures 13 and 14 is similar in many respects to the embodiment illustrated in Figures 8 to 12, corresponding parts having therefore been given corresponding reference numerals with the addition of 100.

In this embodiment of the invention a relatively heavy formed sheet 179 of any desired material may be stamped or otherwise shaped to form the lower rounded portion of the fuselage 170. The majority of the remaining portions of the fuselage may be formed from flat sheets 177 fastened together in any desired manner as by welding. Some of the sheets, such, for example as the sheet 175 may be curved to conform to the desired contour of the fuselage 170.

A flat plate 173 may be fixed to the formed sheet 179 and to the sheets 177 in any desired manner, as by welding, to form a floor for the passenger compartment 190, and to stiffen the fuselage structure torsionally.

A fuselage stabilizing ring 173 may be carried at the rear end of the fuselage to stabilize the craft both longitudinally and laterally. The ring 173 is preferably positioned to surround the propeller 194 to increase the efficiency of the propeller.

The ring 173 may be supported from the fuselage by means of angularly disposed brace members 171. The brace members 171 may, if desired, be tapered outwardly, and streamlined to provide a more rigid structure and also to assist in stabilizing the craft. The brace members 171 are preferably formed from flat sheets shaped to form streamlined strut members.

Attention is directed to the fact that this embodiment of the invention lends itself nicely to mass production, since substantially flat plates may be fixed to the formed sheet 179 to form practically the whole fuselage structure.

Figure 8:
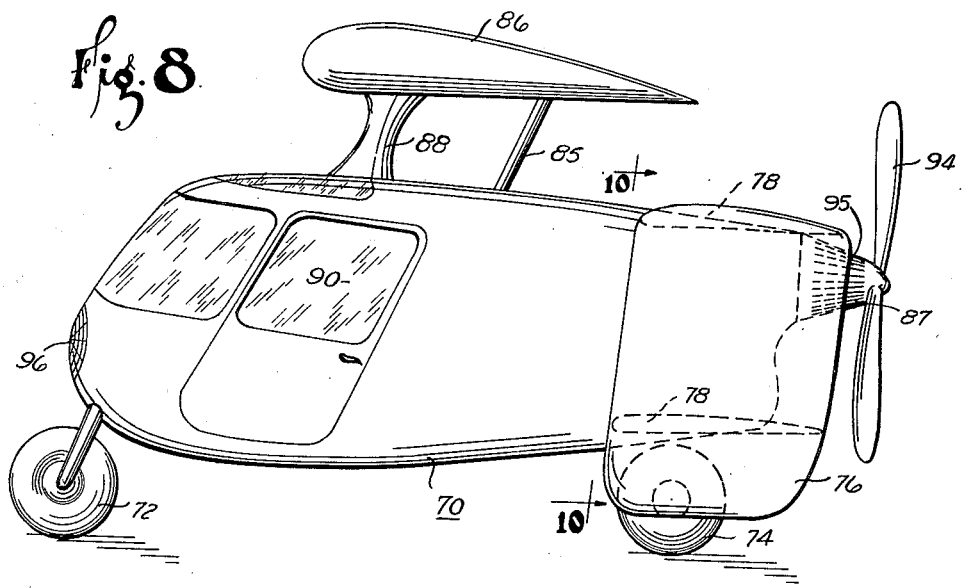
Figure 8 is a view similar to Figure 1, showing a modified form of the invention.
Figure 9:
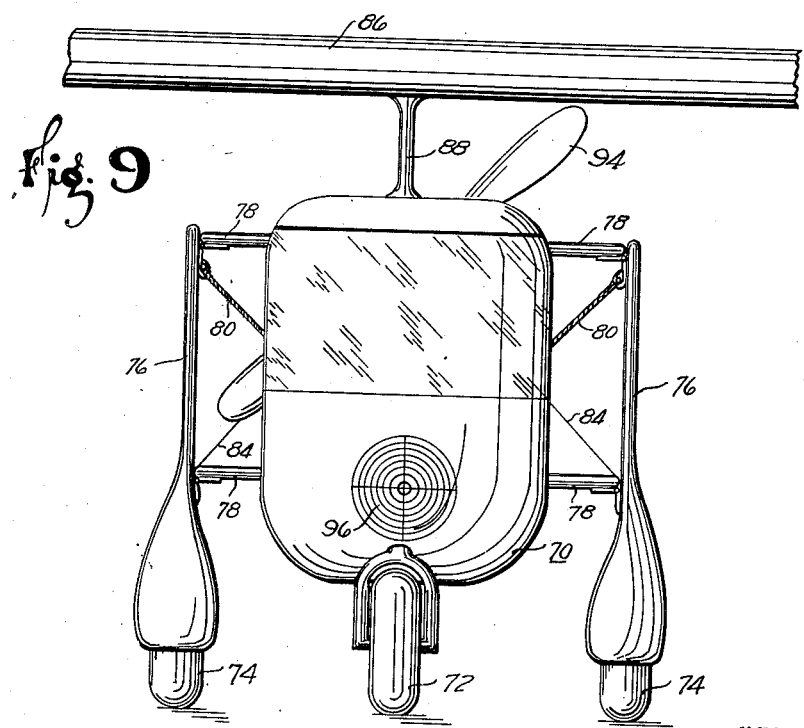
Figure 9 is a front elevation of the aircraft shown in Figure 8.

Figures 15 to 19 show the details of construction of the supporting wing means 86 of Figures 8 and 9. It will be observed that a single spar 201 extending longitudinally through the wing 86 is employed. The spar 201 is formed by a pair of oppositely disposed angles 203, welded or otherwise suitably fixed to a flat plate 205. The angles 203 are disposed in such a manner that their free edges are directed toward the trailing edge of the wing. Generally vertically disposed reinforcing angle members 207 are fixed to the flat plate 205 by a riveting or welding operation to stiffen the spar 201.

The wing is designed to employ a metallic leading edge 209 extending over the spar 201, toward the trailing edge of the wing, to the sections approximately indicated by the points 211. The metallic leading edge section 209 is provided with longitudinally extending reinforcing angles 213 welded or otherwise fixed thereto.

The nose rib is split into upper and lower sections 215 and 217 respectively. The rib sections 215 and 217 are provided with flared or bent over sections 223 as more clearly shown in Figure 17 to stiffen the rib. Slots 225 and indentations 227 are formed in the rib sections 215 and 217 to receive the reinforcing angles 213 carried by the metallic leading edge 209.

To assemble the wing the metallic leading edge 209 is welded or otherwise fixed to the rib sections 215 and 217, the reinforcing angles 213 carried by the section 209 fitting into the slots 225 and the indentations 227. The upper and lower rib sections 215 and 217 are then rolled together and fastened by means of welding or riveting through the overlapping sections 229.

The spar 201 is then placed in the leading section of the wing, the spar being in substantial abutment with the ends of the rib sections 215 and 217. The rearwardly directed free edges of the angles 203 of the spar 201 and the forward portion of the rib section 231, forming the converging section of the wing, are then fastened to the section 209 by a welding or riveting operation.

The converging section of the wing may be covered with any desired material, such, for example as fabric, plywood or metal.

Attention is directed to the fact that this wing design provides a structure which may be formed entirely by a welding or riveting operation as desired. The internal structural members may of course be apertured to decrease the weight of the wing. The wing structure is extremely strong, yet light.

While the invention has been described with particular reference to several desirable embodiments, it is to be understood that the scope of the invention is not to be limited by the constructional details shown and discussed, since many changes may be made without departing from the spirit of the invention as defined by the following claims.

I claim:

1. In an aircraft, a fuselage having a metal forward portion having a forwardly directed air inlet and including a passenger compartment, an engine compartment positioned behind the passenger compartment, an air cooled engine in the engine compartment, a generally horizontally disposed surface forming a floor in the passenger compartment and spaced above the bottom of the fuselage to strengthen the fuselage and to provide an air directing passageway from the air inlet to the engine compartment.

2. In an aircraft fuselage, a metallic forward portion having a forwardly disposed air inlet and including a passenger compartment, an engine compartment behind the passenger compartment, a generally horizontally disposed plate fixed in the fuselage above the bottom thereof to provide a floor in the passenger compartment and form a box type structure to strengthen the fuselage and to provide an air directing passageway beneath the floor of the passenger compartment to direct air to the engine compartment.

3. A metallic airplane fuselage including a passenger compartment comprising a plate shaped to form the curved forward and lower sections thereof, a plurality of substantially flat sheets fixed to said plate, a reinforcing plate fixed to the shaped plate and the flat sheets and forming a floor and a back rest for the passenger compartment, an engine compartment behind the passenger compartment, and means to admit air at the forward end of the fuselage and transmit it to the engine compartment beneath the floor of the passenger compartment.

GEORGE S. SCHAIRER.